R. L. WILLIAMS.
COTTON CHOPPER ATTACHMENT FOR CULTIVATORS.
APPLICATION FILED APR. 9, 1912.
1,084,052.
Patented Jan. 13, 1914.
2 SHEETS—SHEET 1.
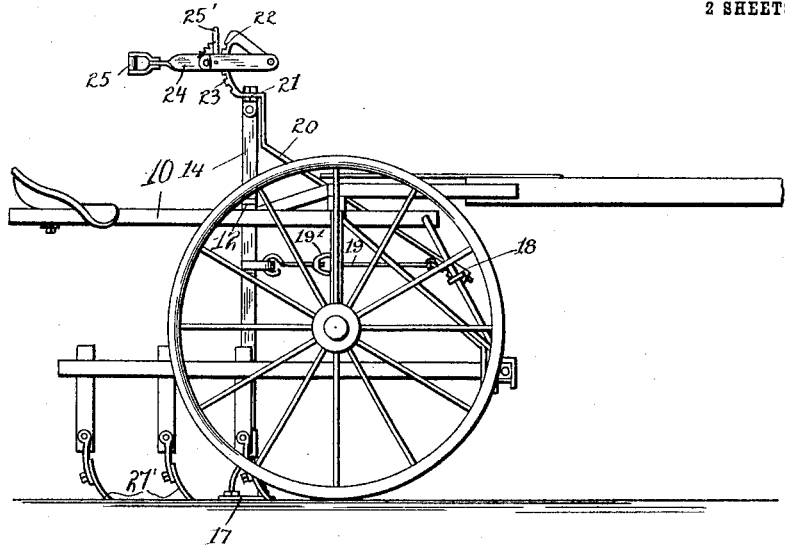
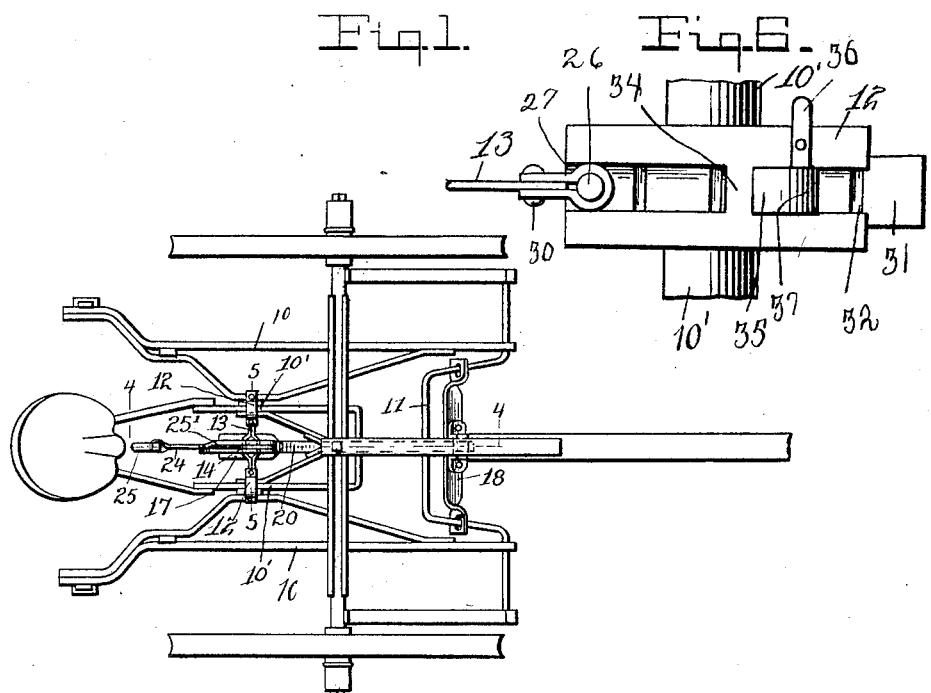
Witnesses
R. N. Jones.
Harry M. Test.
Inventor
R. L. Williams.
By Chandler & Chandler
Attorney R. L. WILLIAMS.
COTTON CHOPPER ATTACHMENT FOR CULTIVATORS.
APPLICATION FILED APR. 9, 1912.
1,084,052.
Patented Jan. 13, 1914.
2 SHEETS—SHEET 2.
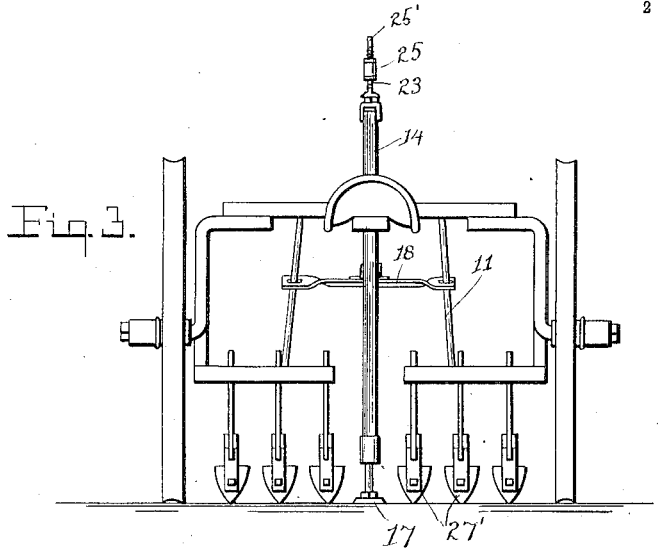
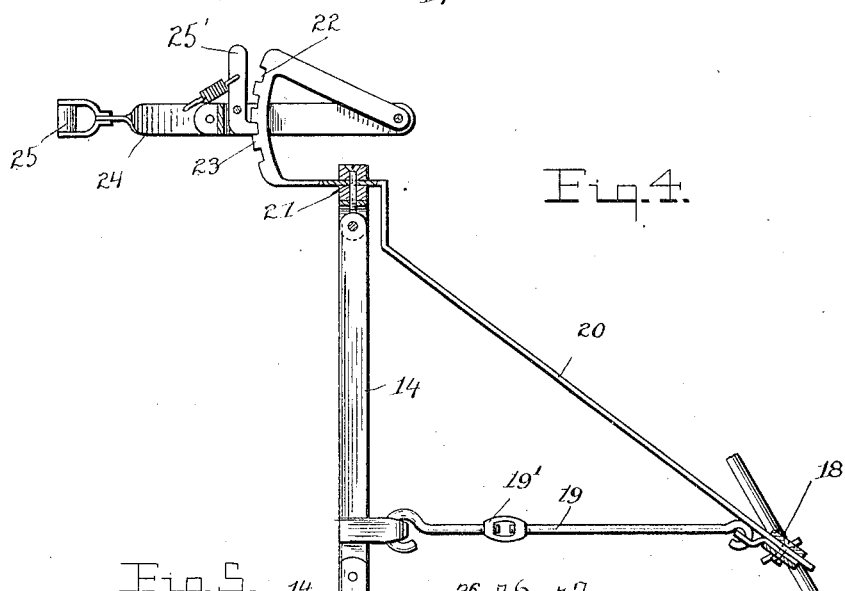
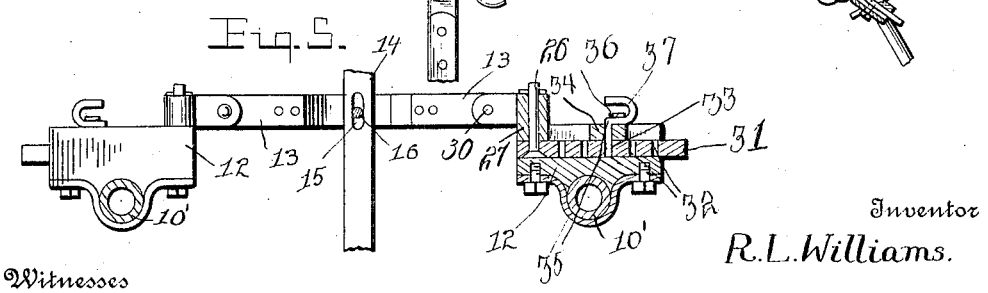
Witnesses
R. N. Jones.
Harry M. Test.
Inventor
R. L. Williams.
By 
Attorney

UNITED STATES PATENT OFFICE.

ROY L. WILLIAMS, OF McKINNEY, TEXAS.

COTTON-CHOPPER ATTACHMENT FOR CULTIVATORS.

1,084,052.

Specification of Letters Patent.

Patented Jan. 13, 1914.

Application filed April 9, 1912. Serial No. 689,577.

*To all whom it may concern:*

Be it known that I, ROY L. WILLIAMS, a citizen of the United States, residing at McKinney, in the county of Collin, State of Texas, have invented certain new and useful Improvements in Cotton-Chopper Attachments for Cultivators; and I do hereby declare the following to be a full, clear, and exact description of the invention, such as will enable others skilled in the art to which it appertains to make and use the same.

This invention relates to improvements in attachments for cultivators, and has particular reference to a cotton chopping attachment therefor.

The principal object is to provide a simple device of this character which may be quickly and easily attached to the frame of the ordinary cultivator, said device being adapted not only for chopping cotton, but can be used for chopping out weeds when cultivating the standing plants.

Another object is to provide a simple device of this character which is operable from the driver's seat.

Other objects and advantages will be apparent from the following description and with particular reference to the accompanying drawings:

In the drawings: Figure 1 is a side elevation of a cultivator showing my device applied thereto, Fig. 2 is a top plan view, Fig. 3 is a rear elevation, Fig. 4 is an enlarged fragmentary detail of the attachment, Fig. 5 is a vertical transverse section on the line 5—5 of Fig. 2. Fig. 6 is a top plan view of one of the clamps 12.

Referring particularly to the drawings, a cultivator is shown which has a frame including the longitudinal side bars 10, the arch brace 11 at the forward portion thereof, and the inner frame having the side members 10' to which my chopping attachment is removably secured. Secured to the side members 10' of the inner frame are the clamps 12. Slidably mounted on the upper side of each of the clamps 12 is a plate 31 having a longitudinal series of openings 32 for registry with an opening 33 in a cross member 34. A pin 35 is passed through the registering openings, said pin having a pivoted latch member 36 carried by the clamp engaged in the hooked end 37 to hold the pin from dropping out of place. The inner end of the plate 31 carries a vertical pin 26 which is arranged to be received in the perforated head 27 on one end of a transverse link or arm 13. The link is formed with a central longitudinal slot 15 across which is disposed a pin 16. Extending vertically through the slot, and pivoted on the pin 16, is a lever 14, the lower end of which has secured thereon a hoe blade 17. It will be noted that by means of the pin 36 carried by the plates 31 and support 34, the clamps can be adjusted toward and away from each other to adapt the device for attachment to cultivators in which the side bars are greater or lesser distances apart. Secured transversely of the frame and to the arms of the before mentioned brace 11 is a bar 18. Loosely connected to the bar 18 is a brace bar 19, the opposite end of which is loosely connected to the lever 14 and is provided intermediately with a turn buckle 19' so that the same may be adjusted to hold the hoe lever in proper vertical position. Pivotally attached to the transverse bar 18 is a lever 20 which extends rearwardly, and is connected by the universal joint 21 to the upper end of the hoe lever, the rear end of the said lever being curved in the manner shown at 22, and formed with a series of rack teeth 23. Pivoted on the rear end of the lever is an adjusting lever 24, having a suitable handle 25 on its rear extremity, and a spring pressed pivoted pawl 25' for engagement with the teeth of the rack segment, whereby the handle lever may be properly adjusted according to the height of the driver's seat.

The hoe lever is so arranged as to extend down between the regular cultivator shovels, 27, so that when it is desired to chop out any particular plants or weeds, the handle lever 24 is depressed and thrown to one side to bring the hoe blade into engagement with the plant to be chopped out, said lever having a horizontal swinging movement on its pivot, and a vertical movement by means of the elongated slot formed therein, thus making it possible to swing the device to one side and up out of engagement with the ground.

It will thus be seen that the device is simple, and the chopping of the plant under the complete control of the operator, making it possible to hoe out the weeds while cultivating the plant.

What is claimed is:

1. The combination with a cultivator having an outer frame and an inner frame said inner frame including side bars, of a cotton chopping attachment therefor comprising an arm adjustably connected at its ends to the said side bars, a chopping hoe pivotally carried centrally on the said arm, a transverse member secured to the frame in advance of the hoe, an adjustable brace swiveled to the hoe and to the said transverse member, a lever pivotally attached at one end to the transverse member and loosely attached to the hoe, and a handle on the lever for moving the same, whereby the chopping hoe is capable of being simultaneously raised or lowered and swung laterally.

2. A cotton chopper attachment for cultivators comprising a vertical lever carrying a hoe blade, an arm pivoted to the lever, clamps on the ends of the arm for detachable engagement with the side bars of the cultivator, each of said clamps comprising a clip, a plate secured to the clip, a perforated plate slidable on the clip, an apertured supporting cross member on the plate for guiding the perforated plate, a pin for engagement in the aperture of the cross member, said pin being provided with a hook, and a pivoted latch carried by the cross bar, for engagement with the hook to hold the said pin in position.

In testimony whereof, I affix my signature, in presence of two witnesses.

ROY L. WILLIAMS.

Witnesses:
T. L. PIKE,
J. T. EDWARDS.

---

Copies of this patent may be obtained for five cents each, by addressing the "Commissioner of Patents, Washington, D. C."